Patented Mar. 14, 1933

1,901,020

UNITED STATES PATENT OFFICE

CHARLES F. BOOTH, OF ANNISTON, ALABAMA, ASSIGNOR TO SWANN RESEARCH, INCORPORATED, A CORPORATION OF ALABAMA

PREPARATION OF PURE PHOSPHATES

No Drawing.  Application filed February 1, 1932. Serial No. 590,318.

This invention relates to a process for the preparation of pure alkali metal phosphates and in particular to the preparation of di-sodium or di-potassium ortho-phosphates.

One object of this invention is the production of pure crystalline di-basic alkali metal ortho-phosphates. Another object is the production of crystalline di-sodium ortho-phosphate, which material shall, when dissolved in water, form a solution of little or no turbidity.

One important simple test for the purity of alkali phosphates consists in making a solution of the phosphate in cold water and then observing the turbidity of the same. During this test, impurities such as iron and particularly aluminum phosphate tend to precipitate out as a suspension causing turbidity.

My material, when subjected to the above test, is considered to come within the object set forth when the solution shows little or no turbidity.

While conducting experiments on various methods of manufacturing di-basic phosphate, I discovered that the addition of small amounts of tetra-basic pyrophosphate to the bi-basic phosphate solution before crystallization, caused the iron and aluminum compounds present and dissolved in the solution to remain almost wholly in the mother liquor, whereas in the absence of the tetra-basic pyrophosphate, a large amount of the above mentioned impurities were precipitated and occluded by the crystals.

In order that others may understand my invention, I will describe one way by which my invention may be practiced, although I do not wish to be limited thereby except as indicated in the claims.

Prepare an aqueous solution of di-sodium phosphate by the neutralization of commercial soda ash with phosphoric acid, said acid containing in the neighborhood of 0.5% combined iron and aluminum phosphates. While various strengths of phosphoric acid may be used, I prefer to use an acid of such strength that the solution produced will have a gravity of 1.25 to 1.26 at 60° C. Such a solution when produced by the neutralization of acid with soda ash will contain some carbon dioxide, which should be eliminated by boiling. When substantially all of the carbon dioxide has been expelled and the solution cooled and adjusted to the proper gravity at a temperature of 60° C, it is filtered so that it is perfectly clear. Now add to this solution sufficient tetra-sodium pyrophosphate to give from 0.05% to 0.25% $Na_4P_2O_7$ by weight in the filtered solution. Usually between 0.1% and 0.14% by weight will be sufficient. Either crystalline or anhydrous tetra-sodium pyrophosphate may be used. The solution is now allowed to crystallize by cooling either in a Swenson-Walker crystallizer or in an ordinary vat depending upon the size and uniformity of the crystals desired.

After crystallization the crystals are carefully separated from the mother liquor by a centrifuge after which they are dried. Thus prepared the crystals will be found to show little or no turbidity when subjected to the aforementioned test.

The above described process may be applied in like manner to the production of other pure di-basic alkali metal ortho-phosphates, such as di-potassium phosphate and of course may be applied to the production of pure di-basic alkali metal ortho phosphate from solutions by whatever means produced. I have described in detail only the production of the di-sodium phosphate by the neutralization of soda ash with phosphoric acid, it will be apparent, however, that di-basic alkali metal phosphate solutions may be prepared by other means than that described. This invention deals particularly with means for obtaining pure crystals of the di-basic alkali metal phosphates from the appropriate solutions, in which a tetra-basic pyrophosphate such as the tetrasodium or tetrapotassium pyrophosphate is used to effect purification of the crystals. Such purification, I believe to take place by the selective elimination of soluble impurities, such as the compounds of iron and aluminum or both from the crystals, as they are being formed in the crystallizer.

Having now particularly described my invention, what I claim is:—

1. Process of producing pure crystalline di-basic alkali metal ortho-phosphate from solutions containing iron and aluminum compounds in solution, comprising adding to said solution a small percentage of a tetra-basic pyrophosphate and then causing said di-basic alkali metal ortho-phosphate to crystallize from said solution.

2. In the process of producing pure crystalline di-basic alkali metal ortho-phosphate from solutions, containing aluminum compounds as dissolved impurity, the step of adding to said solution a tetra basic pyrophosphate and then causing said dibasic ortho-phosphate to crystallize from said solution.

3. Process of producing pure crystalline di-sodium ortho-phosphate from solutions of same containing iron and aluminum compounds in solution, comprising adding to said solution a small amount of a tetra-basic pyrophosphate and then causing di-sodium ortho-phosphate to crystallize from said solution by cooling.

4. Process of producing pure crystalline di-sodium ortho-phosphate from solutions of same containing iron and aluminum compounds in solution, comprising adding to said solution between 0.05% and 0.25% by weight of a tetra-basic pyrophosphate and then causing di-sodium ortho-phosphate to crystallize from solution.

5. Process of producing pure crystalline di-sodium ortho-phosphate from solutions of same containing iron and aluminum compounds in solution comprising adding to said solution between 0.05% and 0.25% by weight of tetrasodium pyrophosphate and then causing di-sodium ortho-phosphate to crystallize from solution.

6. Process of producing pure crystalline di-sodium ortho-phosphate from solutions of same containing iron and aluminum compounds in solution comprising adding to said solution while at a gravity in the neighborhood of 1.25 at 60° C. and while said solution is at a temperature of about 60° C., a small amount of tetra-sodium pyrophosphate and then causing di-sodium ortho-phosphate to crystallize from solution.

7. Process of producing pure crystalline di-sodium ortho-phosphate from solutions of same containing iron and aluminum compounds in solution comprising adding to said solution while at a gravity in the neighborhood or 1.25 at 60° C. and while said solution is at a temperature of about 60° C. between 0.05% and 0.25% by weight of tetrasodium pyrophosphate and then causing di-sodium ortho-phosphate to crystallize from solution.

8. In the process of producing pure crystalline di-sodium ortho-phosphate from solutions containing dissolved aluminum compounds, the step of adding to said solution a small amount of tetra-sodium pyrophosphate in order to cause said aluminum compounds to remain in the solution during subsequent crystallization.

9. In the process of producing pure crystalline, di-sodium ortho-phosphate from solutions containing dissolved iron compounds, the step of adding to said solution a small amount of tetra-sodium pyrophosphate in order to cause said iron compounds to remain in the solution during subsequent crystallization.

10. In the process of producing pure crystalline di-sodium ortho-phosphate from solutions of same containing dissolved iron and aluminum compounds, the step of adding to said solution between 0.05% and 0.25% of tetra-sodium pyrophosphate in order to cause said iron and aluminum compounds to remain in solution during subsequent crystallization.

In testimony whereof I, CHARLES F. BOOTH, affix my signature.

CHARLES F. BOOTH.